United States Patent [19]
Yoshikawa

[11] Patent Number: 5,777,673
[45] Date of Patent: Jul. 7, 1998

[54] COLOR SEPARATION PRISM

[75] Inventor: Kazuo Yoshikawa, Saitama-ken, Japan

[73] Assignee: Fuji Photo Optical Co., Ltd., Saitama-ken, Japan

[21] Appl. No.: 518,360

[22] Filed: Aug. 23, 1995

[30] Foreign Application Priority Data

Aug. 24, 1994 [JP] Japan .................................. 6-199545

[51] Int. Cl.$^6$ .................................................. H04N 9/07
[52] U.S. Cl. ........................................ 348/337; 359/634
[58] Field of Search ............................... 348/336, 337,
348/338, 339; 359/618, 634, 629, 638,
639; H04N 9/07

[56] References Cited

U.S. PATENT DOCUMENTS

| | | | |
|---|---|---|---|
| 4,507,679 | 3/1985 | Bendell | 348/238 |
| 4,857,997 | 8/1989 | Fukami et al. | 348/338 |
| 5,436,661 | 7/1995 | Yamamoto et al. | 348/264 |

Primary Examiner—Andrew Faile
Assistant Examiner—Andrew B. Christensen
Attorney, Agent, or Firm—Sixbey, Friedman, Leedom & Ferguson, P.C.; Gerald J. Ferguson, Jr.

[57] ABSTRACT

A color separation prism having four blocks which can be directly placed at a position, where a color separation prism is to be provided, within a currently-used camera by making the F-number of the color separation prism substantially equivalent to that of an image pick-up lens, and which can implement a dual green system while obtaining the same brightness for the overall optical system as it is obtained from a color separation prism having three blocks. The color separation prism is made up of two prism blocks for separating an incident ray into a green color, one prism block for separating the incident ray into a red color, one prism block for separating the incident ray into a blue color, and an F-number which is substantially the same as an F-number of an image pick-up lens used together with the color separation prism.

4 Claims, 3 Drawing Sheets

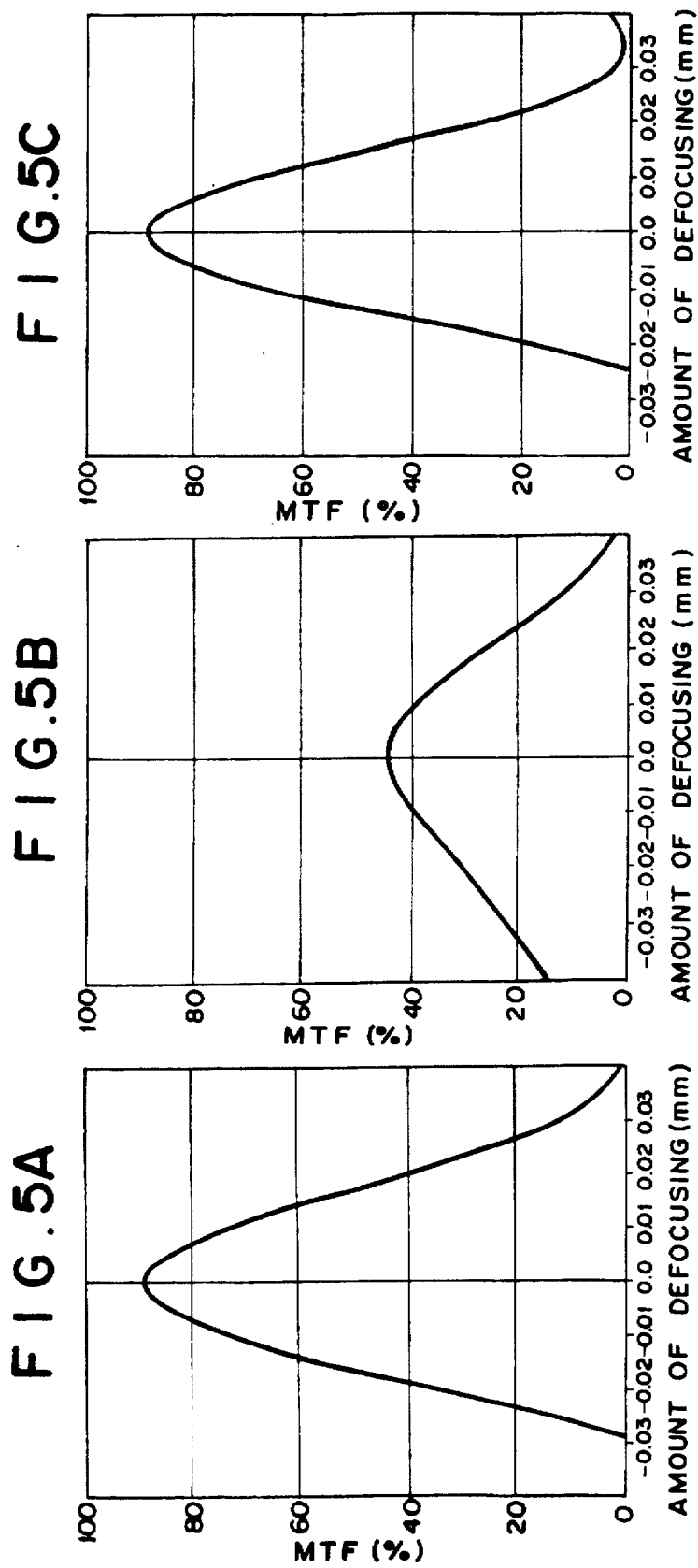

COLOR SEPARATION PRISM

BACKGROUND OF THE INVENTION

1. Field of the Invention

The present invention particularly relates to a color separation prism incorporated into a CCD camera (including a video camera) for separating a color image into three color components, i.e., R, G, and B, and specifically to a color separation prism for use with a high precision camera used in broadcast.

2. Description of the Related Art

Heretofore, a CCD camera for use in broadcast has been provided with a color separation prism for separating a color image into color images, that is, a red image, a green image, and a blue image.

A CCD camera having a higher degree of resolution is required to cope with the recent widespread use of HDTVs. To meet this demand, a dual green system was developed which allows the resolution to be efficiently improved. In the dual green system, two channels are assigned to green which has the greatest effect on the resolution, among R, G, and B. A pixel shift technique is applied to these two green channels to apply a wide band to only a green signal thus efficiently improving the resolution.

However, in the case of a dual green system having three blocks, a common one channel is assigned to R and B separately from G channels (see FIG. 1). Such a configuration makes it impossible to simultaneously place a CCD element 38 for the B/R channel which is common to R and B at the best focusing positions of B and R. This renders the resolution and color reproducibility of the dual green system poor, and hence a stripe filter 36 becomes necessary for this common one channel.

To order to overcome this drawback, and to thus improve the three block dual green system, an inventor of this invention investigated a four block dual green system in which one channel is assigned respectively to B and R. The inventor has already developed a color separation prism having four blocks to implement the four block dual green system (see FIG. 3).

In the color separation prism having four blocks, two CCD elements 18b and 18c for green are respectively positioned in front of two exit planes 17b and 17c among the four exit planes 17a–17d of the color separation prism, and a CCD element 18a for red and a CCD element 18d for blue are respectively positioned in front of the other two exit planes 17a and 17d. When the two CCD elements 18b and 18c for green are placed in front of the associated exit planes 17b and 17c, they are positioned so as to be shifted from each other by one-half pixel pitch. The CCD element 18a for red and the CCD element 18d for blue are respectively set to their optimum focusing positions. As a result of this, it becomes possible to implement the dual green system having superior resolution and color reproducibility using a smaller number of pixels of each CCD element.

However, the color separation prism is constructed to have four blocks, so that the overall size of the color separation prism become bulky. This sometimes makes it difficult for the color separation prism to be placed at a predetermined location within a camera, or results in poor performance of lenses due to a failure of positional matching between the color separation prism and the lens.

The present invention is conceived to overcome these drawbacks in the prior art, and the object of the present invention is to provide a color separation prism which can be placed at a predetermined location within a camera even when arranged to conform to a dual green system, and which can ensure the brightness of the overall optical system.

SUMMARY OF THE INVENTION

According to one aspect of the present invention, the above object is achieved by a color separation prism to be incorporated in an image pick-up camera comprising: two blocks to separate an incident ray into a green color, one block to separate the incident ray into a red color, one block to separate the incident ray into a blue color, and an F-number which is substantially the same as that of an image pick-up lens used together with the color separation prism.

The above color separation prism is made up of four blocks compatible with a dual green system, and the F-number of the color separation prism is set to be substantially the same as that of the image pick-up lens.

Generally, it is difficult to set the F-number of the image pick-up lens to be smaller than about 1.7. Contrary to this, the F-number of a color separation prism having a conventional three-block arrangement is set to about 1.4. Thus, the F-number of the color separation prism has a margin. However, when these optical systems are combined together, the law of minimum is eventually applied even if either of the optical systems has a margin for the F-number. Hence, this margin fails to effectively function.

The present invention is conceived on the basis of that fact. As a result of making the F-number of the color separation prism equivalent to the F-number of the image pick-up lens, it becomes possible to reduce the diameter of each block, that is, the size of each prism responsive to a decrease in the F-number. By virtue of this size reduction, it is possible to reduce the size of the optical system made up of the image pick-up lens and the color separation prism in combination without reducing the overall brightness thereof while the color separation prism has one more block compared with the three-block color separation prism. Accordingly, the color separation prism can be appropriately placed at a currently-used location within the camera.

As a result of the F-number of the color separation prism being reduced to substantially the same as that of the image pick-up lens, it is possible to select materials having a small refractive index as a prism material (glass material), thereby resulting in a greater freedom of the selection of material.

BRIEF DESCRIPTION OF THE DRAWINGS

FIGS. 5A through 5C are graphs showing evaluation results of MTF (modulation transfer function) reproducibility with respect to the embodiment of the present invention shown in FIG. 2, the comparative example 1 shown in FIG. 3, and the comparative example 2 shown in FIG. 4.

PREFERRED EMBODIMENT OF THE PRESENT INVENTION

Referring to the accompanying drawings, a preferred embodiment of a color separation prism will now be described.

Figure 1:
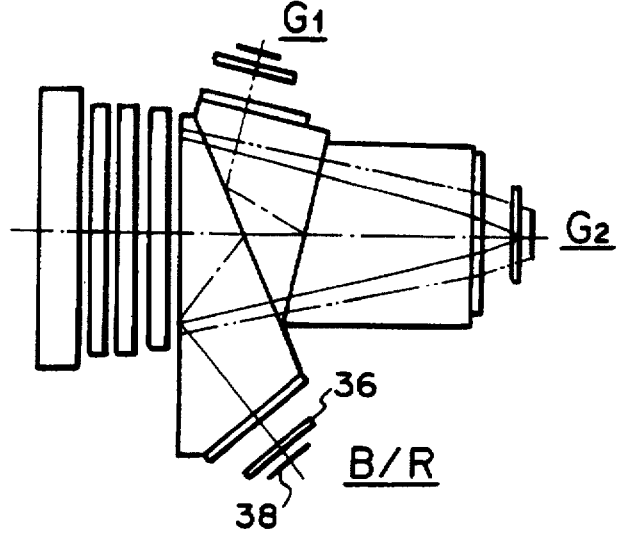
FIG. 1 is a schematic representation showing the construction of a conventional three block dual green system.
Figure 2:
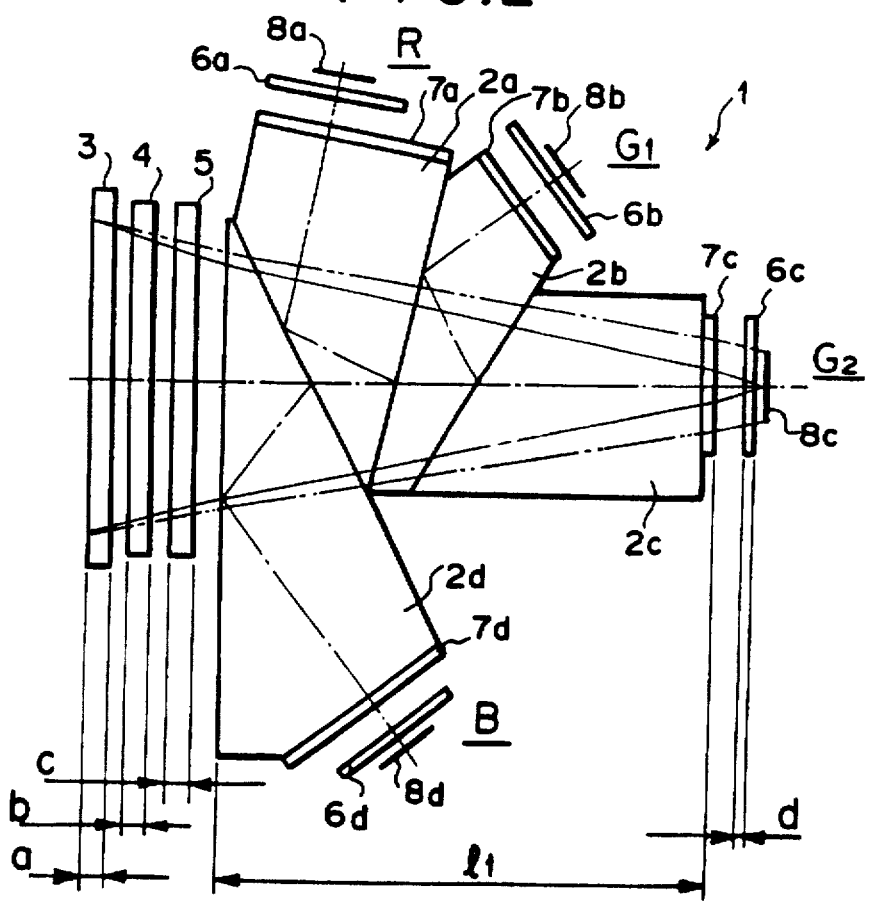
FIG. 2 is a schematic representation showing the construction of a color separation prism according to one embodiment of the present invention.

FIG. 2 is a schematic representation of a color separation prism 1 according to one embodiment of the present invention. This color separation prism 1 is incorporated in a high precision camera compatible with HDTV (high definition television) system. In this color separation prism 1, a prism (R) 2a for a red color, two prisms (G1, G2) 2b and 2c for a green color, and a prism (B) 2d for a blue color are cemented together into a predetermined arrangement. In addition, a near-infrared radiation cut-off filter 3, an ND/color temperature conversion filter 4, and a low-pass filter 5 are positioned, in that order from the light source, on the light-entrance side of the color separation prism 1. Moreover, light-exit planes of the prisms 2a to 2d are respectively covered with trimming filters 7a to 7d.

CCD image pick-up elements 8a to 8d (for example, ⅔" 130-million-pixel FIT CCD) are respectively positioned in front of the light-exit planes of the prisms 2a to 2d with cover glasses 6a to 6d interposed between them, respectively.

The CCD image pick-up elements 8b and 8c of the two channels (G1, G2) for a green color are positioned in front of the light-exit planes of the prisms 2b and 2c while being shifted from each other by only one-half pixel pitch. By virtue of this configuration, a synthetic signal consisting of signals output from the CCD image pick-up elements 8b and 8c becomes a G signal having a broad band (for example, 48 MHz). On the other hand, each of the other color signals, that is, the R and B signals has one-half the band of the G signal (for example, a band of 24 MHz).

In general, it is said to be sufficient if the resolution of a color signal is one-half the resolution of a luminance signal. According to a studio standard, a digital sample ratio of a luminance signal to two color-difference signals is 2:1:1.

For this reason, an image pick-up system having a superior efficiency is obtained by doubling the number of sample points for the G channel which commands 70% of the luminance signal, compared with those of the R and B channels.

The F-number of the above color separation prism is set to 1.7 which is the same as the F-number of the image pick-up lens. As a result of this, it is possible to reduce the thickness 11 of the prisms to 39.3 mm. The overall thickness of the color separation prism 1 is determined allowing for the thicknesses of the filters 3, 4, 5, the thicknesses of the cover glasses 6a–6d (a+b+c+d=6.9 mm) , and air intervals between members along the optical axis, in addition to the thickness 11.

The prisms 2a–2d are made of materials equivalent to BAF52, whereas the filters are made of materials equivalent to BK7. Table 1 shows reflection incident angles and effective F-numbers of the prisms 2a, 2b, and 2d.

TABLE 1

| B:  | reflection incident angle | 26.5° |
| G1: | reflection incident angle | 31°   |
| R:  | reflection incident angle | 13°   |
| B:  | effective F-number        | 1.19  |
| G1: | effective F-number        | 1.68  |
| R:  | effective F-number        | 1.49  |

Figure 3:
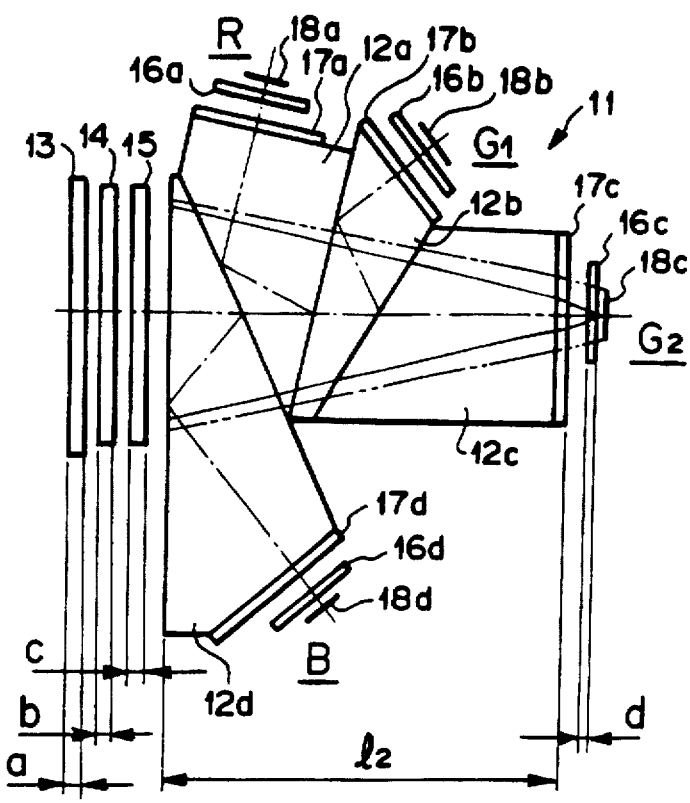
FIG. 3 is a schematic representation showing the construction of a color separation prism according to a comparative example 1.

FIG. 3 shows a comparative example 1 of a color separation prism having four blocks, in contrast to the above embodiment. In other words, the color separation prism in the comparative example 1 is set in such a way that its F-number becomes 1.4. Therefore, compared with the above embodiment, the diameter of each prism is larger. Eventually, the thickness 12 of the prisms becomes 44.0 mm. The thickness of the filters (including the thickness of the cover glass), that is, a+b+c+d, and the air intervals are equal to those in the above embodiment. The whole of the color separation prism becomes thicker by 4.7 mm compared with that of the first embodiment. In FIG. 3, reference numerals, obtained by prefixing each of the reference numerals shown in FIG. 2 by 1, are provided to designate the corresponding features in FIG. 2.

As with the previous embodiment, the prisms are made of materials equivalent to BAF52, whereas the filters are made of materials equivalent to BK7. Table 2 shows the reflection incident angles and effective F-numbers of the prisms 12a, 12b, and 12d.

TABLE 2

| B:  | reflection incident angle | 25.5° |
| G1: | reflection incident angle | 32°   |
| R:  | reflection incident angle | 13°   |
| B:  | effective F-number        | 1.36  |
| G1: | effective F-number        | 1.42  |
| R:  | effective F-number        | 1.39  |

Figure 4:
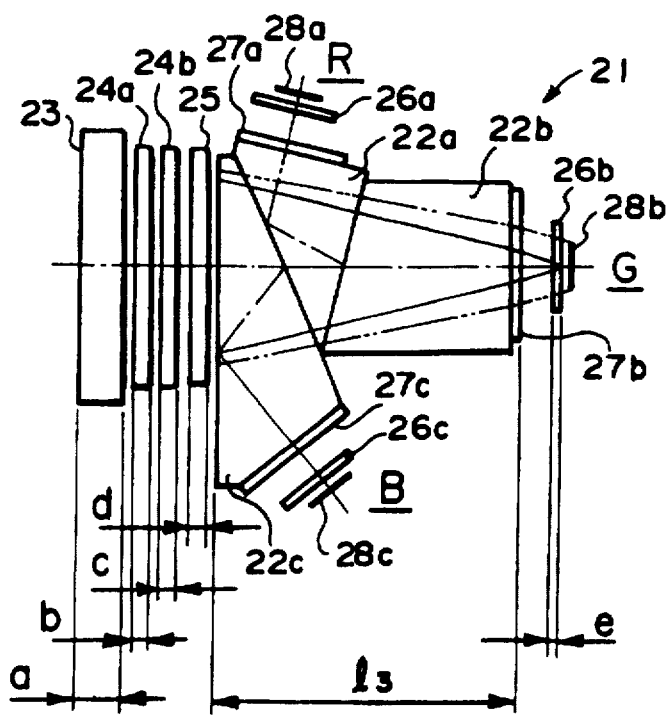
FIG. 4 is a schematic representation showing the construction of a color separation prism according to a comparative example 2.

FIG. 4 shows a comparative example 2 of a color separation prism having three blocks, in contrast to the previous embodiment. The color separation prism in the comparative example 2 is set in such a way that its F-number becomes 1.4 (which is the same as the F-number of a color separation prism currently used in broadcasting equipment. Since the color separation prism in this example has one less block for the green prism, the thickness 13 of the prisms becomes 34.0 mm. The thickness of the filters 23, 24a, 24b, 25, and 26a–26c (including the thickness of the cover glass), that is, a+b+c+d+e is 12.2 mm compared with the previous embodiment. The whole of the color separation prism becomes substantially the same as that of the first embodiment.

As with the previous embodiment, the prisms are made of materials equivalent to BAF52, whereas the filters are made of materials equivalent to BK7. Table 3 shows the reflection incident angles and effective F-numbers of the prisms 22a and 22c.

TABLE 3

| B: | reflection incident angle | 25.25° |
| R: | reflection incident angle | 13°    |
| B: | effective F-number        | 1.42   |
| R: | effective F-number        | 1.42   |

As is evident from the comparisons between the embodiment and the comparative examples 1 and 2, the color separation prism of the present invention has a four-block structure conforming to the dual green system, but is constructed so as to have substantially the same thickness as that of the conventional three-block color separation prism.

As a result of this, the color separation prism according to the present invention can be directly positioned at an optimum location for a color separation prism within a camera conforming to a conventional standard. Thus, this color separation prism can be appropriately combined with an image pick-up lens without modifying the design of each part of the camera. Since the brightness of the color separation prism is set to the same as that of the image pick-up lens, the brightness of the overall optical system when the color separation prism is combined with the image pick-up lens has no substantial drop compared with, for example, the brightness of the comparative examples 1 and 2.

FIGS. 5A to 5C are graphs showing evaluation results of MTF reproducibility of a B/W pattern set to have a line width of 69.5 lines/mm (assuming a television screen of a television having 750 horizontal lines) with respect to the embodiment (see FIG. 5A), the comparative example 1 (see FIG. 5B), and the comparative example 2 (see FIG. 5C). In other words, the vertical axis of the graphs represents extent of MTF (%), whilst the horizontal axis of the graphs represents the amount of defocusing (mm).

As can be seen from FIGS. 5A to 5C, the color separation prism of the present invention is significantly improved in MTF reproducibility compared with the color separation prism of the comparative example 1 (having four blocks; F-number 1.4), and is slightly improved in MTF reproducibility compared with the comparative example 2 (having three blocks; F-number 1.4).

The color separation prism of the present invention is not limited to the previously mentioned embodiment, but it can be subject to various modifications.

For example, glass materials forming the prisms and filters are not limited to the materials employed in the above embodiment, other glass materials can be selected, as required. In this respect, compared with the conventional color separation prism, the F-number of the color separation prism of the present invention is lowered to be substantially the same as the F-number of the image pick-up lens. Glass materials having lower refractive indices are selectable, thereby resulting in greater freedom of selection of the glass materials, and also rendering the color separation prism economical interms of manufacturing cost.

While this invention has been described with reference to an illustrative embodiment, this description is not intended to be construed in a limiting sense. Various modifications of the illustrative embodiment, as well as other embodiments of the invention, will be apparent to those who are versed in the art upon reference to this description. It is, therefore, contemplated that the appended claims will cover any such modifications or embodiments as fall within the true scope of the invention.

What is claimed is:

1. A color separation prism to be incorporated in an image pick-up camera comprising:

two prism blocks for separating an incident ray into a green color;

one prism block for separating the incident ray into a red color;

one prism block for separating the incident ray into a blue color; and an F-number which is substantially the same as an F-number of an image pick-up lens used together with the color separation prism.

2. The color separation prism as defined in claim 1, wherein one of the prism blocks for a green color has a reflection incident angle of 31°; the prism block for a red color has a reflection incident angle of 13°; and the prism block for a blue color has a reflection incident angle of 26.5°.

3. The color separation prism as defined in claim 2, wherein the one prism block for a green has an effective F-number of 1.68; the prism block for a red color has an effective F-number of 1.49; and the prism block for a blue color has an effective F-number of 1.19.

4. The color separation prism as defined in claim 1, wherein the color separation prism is made of materials equivalent to BAF52.

* * * * *